June 17, 1958 R. C. WEISE 2,839,693

ELECTRONIC COMPUTER POWER SUPPLY CIRCUITS

Original Filed March 4, 1955

INVENTOR.
RICHARD C. WEISE

BY Laurence R. Brown

ATTORNEY

2,839,693

ELECTRONIC COMPUTER POWER SUPPLY CIRCUITS

Richard C. Weise, Philadelphia, Pa., assignor to Burroughs Corporation, Detroit, Mich., a corporation of Michigan Original application March 4, 1955, Serial No. 492,062. Divided and this application July 5, 1956, Serial No. 595,884

2 Claims. (Cl. 307—150)

Figure 1:
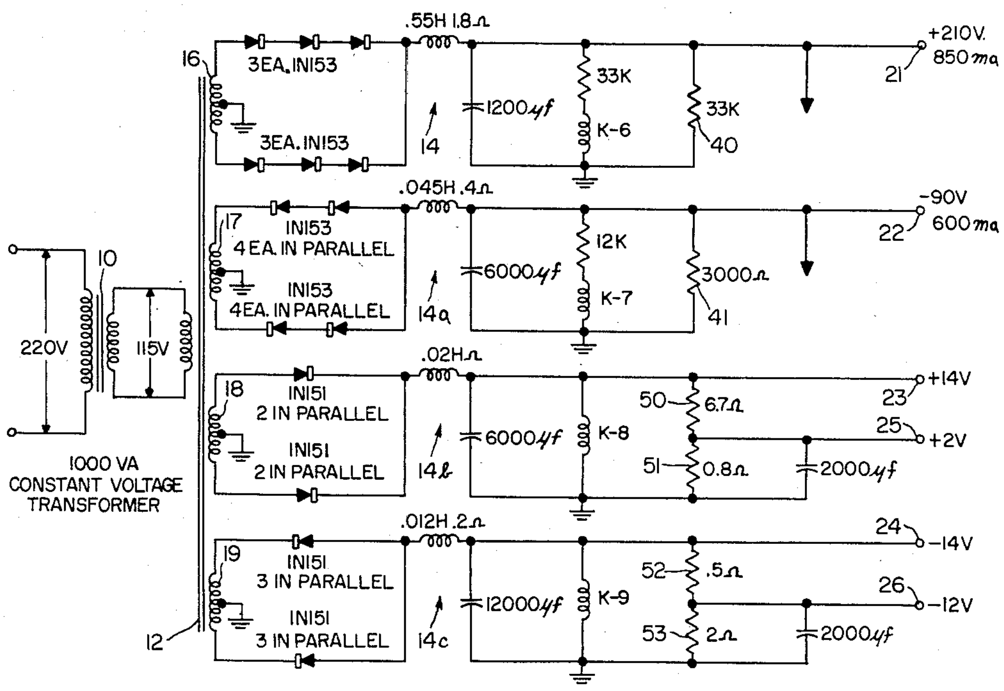

This invention relates to electronic digital computers and more particularly to general-purpose computers having a plurality of different power supply potentials requiring substantial regulation. This application is a division of the copending patent application for Electronic Computer System, Serial No. 492,062, filed March 4, 1955

Prior art general-purpose computers have been designed which are extremely high in cost and comprise excessive amounts of equipment which utilize large amounts of power in operation. Such machines have been available to only those relatively few users who have control of unlimited funds for acquiring and operating such machines. In such machines large amounts of power are necessary resulting in difficulty in maintaining a plurality of supply potentials for the same source at regulated levels.

Digital computer circuits must be extremely reliable in operation. Many millions of computations involving logical manipulation of electrical pulses must be made without error. It is necessary therefore to provide well-regulated voltages to the computer circuits to assure that changes in voltage levels do not contribute to computation errors. Computers depend for operation upon simultaneous functioning of many different circuits with power requirements of each circuit varying substantially at different times as a result of different data input and computer program conditions. Each individual circuit however must function properly, and variations of loading at one circuit must not modify the operations of another circuit. Thus, changes in power supply potentials with loading, and changes in temperature are important, as well as any variation in circuit components.

Power supply potential variations may result from both external line conditions and internal load variations. In the prior art such variations are compensated for in electronic computer systems by using complex regulator devices such as rotating generators, saturable magnetic regulators and vaccum tube feedback regulators. Also, such circuits required a large amount of space to provide for location of the complex regulation circuits and to permit heat dissipation from heaters in regulator tubes and rectifiers. Not only is spacing important in compact computer systems requiring close physical proximity of power supply and computer circuits, but also the heat dissipation, since changes in ambient temperature produced by power supply circuits may cause enough departure of adjacent computer components from their original circuit values to introduce computation errors.

Accordingly, an object of the present invention is to provide a compact, small size general-purpose computer with nominal power requirements and small heat dissipation.

A further object is to provide such an electronic digital computer power supply system which is low both in initial cost and in operating cost.

Another object of the invention is to produce a regulated power supply system which is not dependent upon feedback regulation loops.

In accordance with this invention, a power supply system is provided for producing a plurality of potentials for different computer circuits. Regulation of all circuits to reduce external line voltage variations is provided by means of a single constant voltage input transformer for levelling out input power line variations without introducing large heat losses. Individual, very low resistance power rectification and filter circuits are provided for producing the separate potentials which accordingly prevent large voltage variations in response to variations of loading within the computer and to further minimize heat dissipation of the system.

By utilizing rectifiers, very low resistance diffused junction germanium and low resistance transformer and choke windings of very low rectifier losses result with attendant large savings in heat and circuit losses which contribute to poor regulation. By these techniques, for the first time it has been possible to provide a stable power supply potential capable of operating computer circuits without the usual regulatory means and relying solely for regulation of internal load changes upon inherently low power supply resistance.

Figure 2:
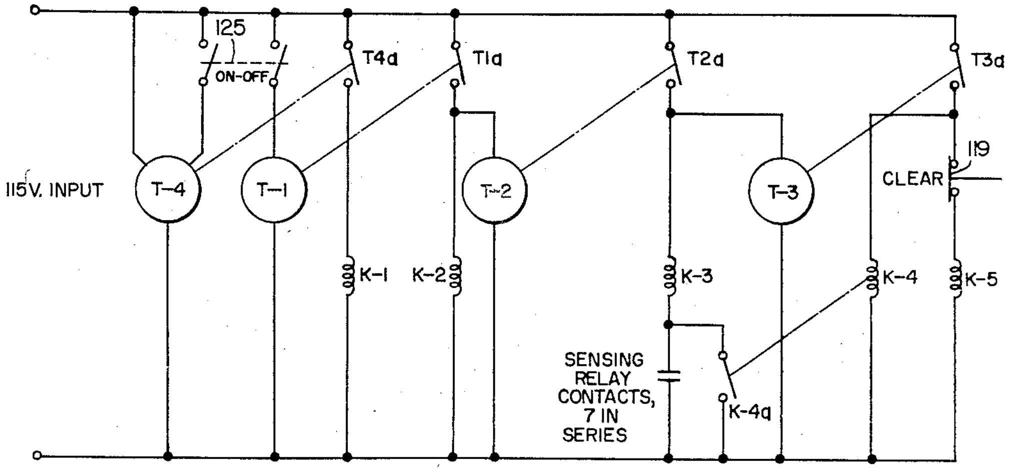

A more detailed description of the power supply system, organization and mode of operation is presented hereinafter with reference to the accompanying drawings, wherein:

Fig. 1 is a schematic diagram of a computer power supply circuit embodying the invention; and Fig. 2 is a schematic diagram of the power supply control circuit.

The direct current power supply circuits for the computer system of the above-mentioned copending application are shown schematically in Fig. 1. These circuits supply all the direct current potentials necessary for operation of the computer tube and diode circuits. The required regulation of the D. C. output voltages is accomplished without power control servo systems. A constant voltage transformer serves to regulate the input to the supply. Regulation of the D. C. output voltages under static conditions is achieved by the use of diodes which have a low impedance, such as the germanium junction type, and the use of low D. C. resistance windings in the transformer and filter inductances. Heavy capacitance filtering provides the required regulation for transient changes in the input voltage and changes in the load currents. The required current carrying capacity is provided by coupling 1N153 germanium junction power diodes in parallel in the high voltage sections and 1N151 diodes in the low voltage sections. Series rectifier diode connections are made in the high voltage sections for reducing the reverse voltage applied to the diodes. In the manner shown, additional +90 volt and −225 volt power supply sections may be included. Relays K6 and K9 are sensitive relays for sensing failures in supply potentials, and have contacts in series with the direct current power supply energizing relay K3 of Fig. 2.

In order to substantially eliminate the effect from variations of potential on the input supply line a constant voltage transformer 10 is provided for establishing a constant 115 volt input potential to the primary of the power supply transformer 12. Any high frequency transient variations in the input supply line are decoupled from the D.-C. terminals by the L-C filter circuits 14 in the respective rectification circuits for producing the various output potentials.

Each of the secondary windings 16 through 19 is provided for producing the required potentials at the corresponding output terminals 21—24. The core of power transformer 12 has enough iron to avoid any danger of saturation. The windings thereon, particularly secondary windings 16 through 19, are provided with enough copper that the resistance is negligible. Thus changes in load current are not substantially effective in causing poor regulation by means of the transformer 12 and windings 16 through 19.

In provision of like voltages of opposite polarities, such as those at terminals 23 and 24, the same secondary winding may be used without disturbing regulation since time sharing of the winding occurs on alternate half power cycles. Any loading due to internal current changes in the positive supply thereby do not disturb the regulation of the negative supply, etc.

Filter chokes 26 through 29 in the different potential supply circuits contain low resistance windings likewise to avoid large potential variations with changes in current requirements. The values shown for resistance and inductance are typical when the usual range of load currents is encountered at the potentials specified to maintain a regulation of better than ±5%.

In ordinary computer power supply systems a large potential drop is produced across the rectifier devices. This is considerably reduced in the present system by utilizing crystal rectifiers of the diffused junction germanium type such as the type numbers 1N151 or 1N153 provided by the General Electric Company. These rectifiers have heat dissipating fins mounted thereon for permitting substantial current flow without disturbing reliability by overheading of the junction. For each potential level, the crystals are connected in full wave rectifier circuits.

The various supply potential requirements are met by connecting the rectifiers in series to meet the back voltage requirements, and in parallel to meet the current capacity requirements. By employment of this type of rectifier it has been possible to keep the overall circuit losses low enough to maintain good regulation in view of internal load changes without resorting to troublesome servo regulation devices. The circuit simplicity, in fact, substantially contributes to computer reliability, because of permanence of characteristics of all components, and lack of dependence upon vacuum tube regulators or other complex regulatory means requiring maintenance procedures. Furthermore, the lack of filaments, heaters and other heat dissipating elements of rectifiers and regulators provide an efficient system desirable for packing in compact computer systems of the type described in the above mentioned copending application for patent.

A further increase in the power supply efficiency is afforded because bleeder current is unnecessary and safety resistors 40 and 41 are supplied only for discharging the circuit in event of power failure. In more poorly regulated systems, bleeder currents amounting to a large percentage of total current capabilities are necessary for stabilization purposes, contributing to substantial IR losses in the rectifier circuits and to higher ambient operating conditions as well as substantially increased cost. Note in the present system, however, that resistor 40 draws about 6.5 milliamperes which is less than 1% of the total source capability of about 850 milliamperes. The resistors 50 through 55, which draw a larger percentage of current, do not serve as bleeders but voltage dividers for producing the required lower voltages at terminals 25 and 26.

Unduly large variations caused by circuit abnormalities are sensed by protective relays K6 through K9 to operate the power control circuits of Fig. 2.

The computer power switch 125 shown in Fig. 2 starts a power control operating cycle. Before the computer power is applied by the control circuit a wait indicator is energized, and conversely a ready light shows completion of the power control cycle. Upon closing of the power switch 125, the time delay relay T4 is instantaneously energized and thereafter serves to provide a thirty second time delay before de-energization when the power switch 125 is re-opened. Thus, relay K1 is energized immediately by contacts T4*a* to provide power to the magnetic memory motor, ventilating fans in the computer console, and a low potential tube heater circuit.

Thirty seconds after switch 125 is closed the time delay relay T1 is operated, thus applying power by way of contacts T1*a* to relay K2 and time delay relay T2. Relay K2 increases the tube heater potential to normal by coupling heater power circuits in parallel, rather than in series as first connected with relay K1. After the thirty-second delay produced by relay T2 occurs and contacts T2*a* close, relay K3 applied power to the direct current computer power supplies by way of the closed contact K4*a*. Each of the seven series sensing relay contacts will be closed when corresponding voltages at different critical computer circuits are available. Failure of any of the voltages will cause the relay K3 to drop out and remove the entire direct current supply excitation any time after relay contact K4*a* is opened.

In Fig. 2, after the five second delay produced by relay T3, contacts T3*a* energize the relays K4 and K5. Relay K4 operates to transfer energization from the indicator panel wait light to the ready light. Relay K5 serves to reset the computer state selector to the idling state initially by holding off bias on one side of the respective state counter flip flop circuits. Also to eliminate the possibility of thyratrons from firing with immediate application of power, the relay K5 applies plate voltage to the thyratrons. The clear switch 119 therefore is coupled in series with the relay K5 to assure that the computer may be sent to the idling state whenever manual control is effected.

It is evident from the foregoing specification that an improved electronic computer system is afforded with an attendant novel power supply having many advantages over prior art systems. Accordingly, those novel features descriptive of the improvements afforded to the art by the invention are defined with particularity in the following claims.

I claim:

1. In an electronic digital computer system, a plurality of logical control circuits each operable from a different supply potential level and each requiring a stable level to assure reliable computer operation, a single transformer input circuit supplying all the supply potentials, a constant voltage device coupling the power line to the transformer primary winding serving to control line potential, a plurality of low resistance secondary transformer windings, a circuit coupling each secondary winding with low resistance semi-conductor rectifier devices, and a low resistance filter circuit coupled to each of the secondary windings and the rectifier devices, whereby output voltages remain constant in the absence of feedback control means.

2. In an electronic computer a power supply system comprising in combination, a multiplicity of separate computer circuits coupled to potential output terminals in said system, each computer circuit requiring a substantially constant potential source providing a particular voltage level, each separate computer circuit having substantially varying load conditions subject to change with different data input and computer program conditions, a single power transformer having an input winding and separate low resistance secondary windings for the various potential sources, a low resistance full wave rectifier circuit for each potential comprising diffusion junction crystal diodes, a single low impedance filter choke coupled to each rectifier circuit, a filter capacitor coupled to each potential output terminal, bleeder resistor devices coupled across the filter capacitors which pass only a small percentage of the output current capabilities of the potential sources, and power line variation reducing means coupled to the input winding of said transformer.

No references cited.